United States Patent [19]

Eggenberger et al.

[11] 4,100,403
[45] Jul. 11, 1978

[54] METHOD AND MEANS FOR DISCRIMINATING BETWEEN SYSTEMATIC AND NOISE-INDUCED ERROR IN DATA EXTRACTED FROM WORD ORGANIZED MEMORY ARRAYS

[75] Inventors: John Scott Eggenberger, Los Altos; Arvind Motibhai Patel, San Jose, both of Calif.

[73] Assignee: International Business Machines Corporation, Armonk, N.Y.

[21] Appl. No.: 790,506

[22] Filed: Apr. 25, 1977

[51] Int. Cl.² .................. G06F 11/12; G11C 29/00
[52] U.S. Cl. ................... 235/312; 235/303.2
[58] Field of Search ............ 235/153 AM, 303.2, 312; 340/146.1 AL, 174 ED, 174 TF; 360/200, 201

[56] References Cited

U.S. PATENT DOCUMENTS

| Re. 28,923 | 8/1976 | Patel | 340/146.1 AL |
|---|---|---|---|
| 3,774,153 | 11/1973 | Ahamed | 340/146.1 AL |
| 3,792,450 | 2/1974 | Bogar | 340/174 ED |
| 3,868,632 | 2/1975 | Hong et al. | 340/146.1 AL |
| 3,909,810 | 9/1975 | Naden et al. | 340/174 ED |
| 4,005,405 | 1/1977 | West | 340/146.1 AL |
| 4,030,067 | 6/1977 | Howell et al. | 235/153 AM |

*Primary Examiner*—Charles E. Atkinson
*Attorney, Agent, or Firm*—R. Bruce Brodie

[57] ABSTRACT

Systematic and noise-induced errors, as detected in words extracted from corresponding locations in a $m \times n$ word organized memory array, are distinguished as to their source and are corrected by using the conjunction of a nonzero error checking syndrome and the a'priori location defects status as indexed by the location address of the extracted words from an external table memory.

9 Claims, 12 Drawing Figures

MEMORY WORD = m BITS
r WORDS PER MEMORY ACCESS
s BITS / SYMBOL / WORD
(m/s) SYMBOLS / WORD WHERE:
 r CHECK BYTES / WORD.
 (m/s = [(m/s)-c] + c

MAPPING OF ROM
CAPACITY: n WORDS — n LOOPS/CHIP
OVER m CHIPS

RELATIVE TIMING BETWEEN DATA ACCESSING AND POINTER ADDRESSING

MINOR LOOP/MAJOR LOOP DATA TRANSFER

METHOD AND MEANS FOR DISCRIMINATING BETWEEN SYSTEMATIC AND NOISE-INDUCED ERROR IN DATA EXTRACTED FROM WORD ORGANIZED MEMORY ARRAYS

SUMMARY OF THE INVENTION

This invention relates to a method and means for discriminating as to their source between systematically and randomly-induced errors in data extracted from a word organized $m \times n$ memory array. One form of an array consists of an $m \times n$ matrix of loops, each loop being adapted to recirculate a bit coded stream therein. Typically, the matrix comprises a row of $m$ chips, each chip having $n$ parallel loops forming thereby a column. Data is accessed from the memory a predetermined number of $m$ bit words at a time. In this regard, when a word is written into the memory, then one bit is written into each of the $m$ chips by an associated column conductor. Also, when a word is extracted from the memory, each chip contributes one bit. The columns of loops in which data is recirculating are termed minor loops while the column conductors for transferring data to or from the loops are termed major loops.

An $m$ bit word or words written into a memory array will include a pre-determined number of checking bits. Error checking bits can be calculated to identify the existence and location of errors in the corresponding $m$ bit word to which they are appended. When one or more $m$ bit words are extracted from the array, the checking bits of the extracted word are tested. However, the checking bits in and of themselves do not discriminate as to whether the error was induced by a systematic or noise source.

It is well recognized that memory media such as magnetic disks, tapes, or bubble loops are prone to the occurrence of physical imperfections or defects on their surface during their manufacture. The location of these defects can be determined before the memory media is finally incorporated into a memory system.

It was unexpectedly observed that systematic and noise-induced errors could be distinguished in words extracted from a memory array by using the conjunction of a non-zero syndrome of the checking bits and the a'priori location defect status as indexed by the address of the extracted word from an externally stored table. With each word or group of words extracted from memory there may exist no error, a noise-induced or soft error, or defect-induced or hard error. The conjunction of a non-zero syndrome and an indication of the existence of a location defect is taken as a synonym for hard error in this invention.

The invention can be further explicated as a method and apparatus for discriminating between no error, defect induced error, and noise induced error for the purpose of correcting these errors in formatted data accessed from an addressable memory, the data being inclusive of redundancy patterns. The method comprises the steps of (1) forming a table of concordance between each memory address and its defect status; (2) accessing both formatted data from at least one memory address and the counterpart defect status from the concordance table; (3) determining the syndrome of the accessed data; and (4) indicating from the accessed data the presence of either: a defect induced error upon the concurrence of a non-zero syndrome and a defect at the counterpart memory address; a noise induced error upon the concurrence of a non-zero syndrome and no defect; or no error upon the occurrence of a zero syndrome.

ARCHITECTURE AND ACCESSING OF MAJOR/MINOR LOOP MEMORIES

In conventional memory systems, information must move from one device to another, through inter-connecting conductors and high-gain amplifiers. In addition, the actual magnetic material, such as magnetic tape, disk, or drum is transported past sensing and writing and devices in order to effectuate data operations. In contrast, in a magnetic bubble memory, these functions may all be accommodated within one continuous ferromagnetic medium. Magnetic bubbles representing data move in a plane of thin sheets of magnetic material such as rare earth or orthoferrite crystals. They can be shifted into precisely defined positions at high speed with little energy. The magnetic material itself remains stationary.

One of the most popular types of bubble memory organizations is that of the major/minor loop type disclosed in U.S. Pat. No. 3,618,054 to Bonyhard et al. This form of memory organization includes a closed major loop. Typically, this closed loop is established by an arrangement of T/I permalloy circuits on a rare earth orthoferrite platelet. The bubbles circularly propagate around the loop by in-plane rotating magnetic field action. The major loop is generally elongated such as to allow a number of minor loops to be aligned there along. Two-way transfer gates permit the transfer of bubbles from the minor loop to the major loop and from the major loop to the minor loop. Further access to the major loop is achieved by a detect and read connection thereto and by a separate write connection. Relatedly Bhandarkar U.S. Pat. No. 3,999,172 discloses a major/minor loop type bubble memory in FIG. 3 thereof in which a separate column conductor coupled through one-way switches is coupled to each of the minor loops for writing while an electrically independent column conductor coupled through oppositely poled one-way switches is coupled to the minor loops for reading.

The major/minor loop form of memory organization permits a synchronized domain pattern, since the propagation of the bubbles around the loops are synchronous with the rotation of the in-plane field. That is, parallel transfer of data bubbles to or from a plurality of minor loops may be made simultaneously to or from the major loop. Moreover, a plurality of chips each with a pair of major loops and a plurality of associated minor loops may be treated together. It is common to arrange such chips in rows and even further to stack rows of data chips in time multiplexed layers to achieve complex memory structures. Significantly, the bit coded bubble streams in all of the loops in all of the chips are synchronized with in-plane rotations. In this regard, brief references to FIG. 2 of this invention. It should be noticed that memory system 14 includes a major/minor loop memory 19 in which clock 53 drives rotating field source 33 in turn driving memory 19.

As will be subsequently discussed in connection with FIGS. 6A–D, all of the minor loops on a chip, upon command, transfer in parallel bubbles from their corresponding positions to the major loop. The bubbles are then serially detected as they propagate past a read position. New data may also be inserted at a write position for parallel transfer back into the major loops at an appropriate time.

DEFECTS IN MEMORY FABRICATION

In a bubble memory, every loop and every chip has to be physically perfect for the system to perform satisfactorily. Since chips contain entire groupings of registers, a minor flaw in one minor loop might result in discarding the entire chip. Unlike a system comprising discrete components, it is not possible to merely replace only one faulty component and have the remainder of the good components intact. Although it is relatively easy to fabricate chips wherein only one or two of the minor loops may be open or otherwise faulty, it is relatively difficult and exacting to make a chip wherein every loop is in perfect condition. Therefore, when perfect chips are required, the required stringent quality standard renders the overall production costs of a bubble memory system undesirably high because a large percentage of the chips are discarded.

ACCESSING MULTIPLE CONTIGUOUS WORDS FROM MAJOR/MINOR LOOP MEMORY TO MAXIMIZE THE DATA RATE

Figure 2:
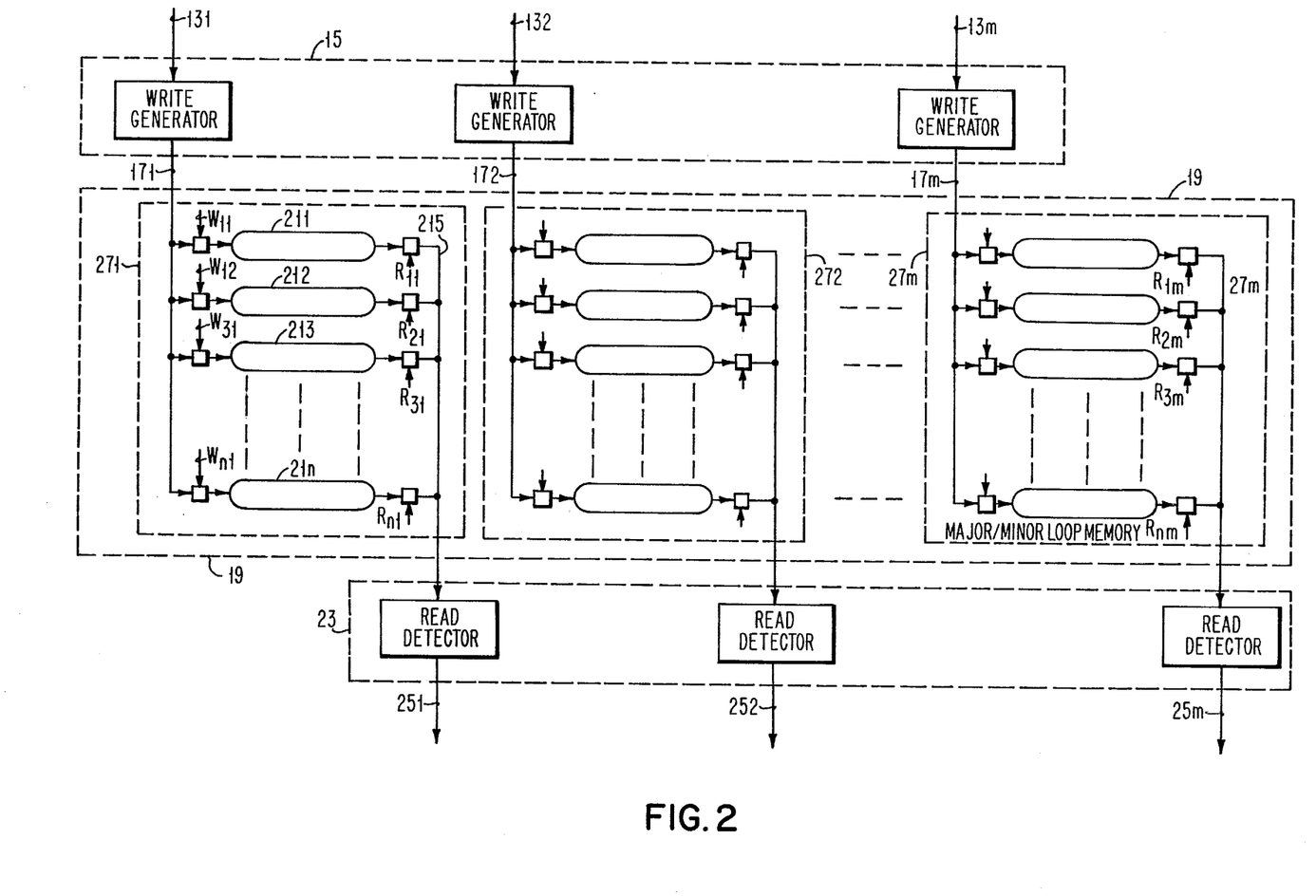
FIG. 2 depicts a $m \times n$ major/minor loop memory array.

Referring now to FIG. 2, there are shown $m$ conventional major/minor loop bubble memory chips, each of which comprise $n$ recirculating shift register like minor loops 211, 212, 213. To access the information stored in the bit coded streams circulating in the respective minor loops, each minor loop 211 is interfaced to a major loop read conductor 215 through a transfer switch $R_{11}$. The read conductor 215, in turn, terminates in a read detector 23. The read detector senses the bit coded values propagating therein. Each transfer switch R selectively causes elements of the bit coded stream to recirculate in the minor loop or to be transferred from the major loop to the read conductor. Significantly, the bit coded bubble stream movement in both the minor loop and read conductor are sufficiently discrete to consider the loop and the conductor as being formed from shift registers whose cells are geometrically square or nearly so. For purposes of this invention, it is assumed that a major loop coupling each of the $n$ minor loops on one side geometrically requires that the ith cell of the major loop operates as a bit transfer port for the jth minor loop. The bit transfer port in the major loop must be spaced apart by at least one cell from that major loop cell operating as the transfer port for the $j+1$ minor loop. With cells on either side of each transfer port empty, it follows that a serial data rate of the major loop would be reduced by at least one half, as compared to what it would have been if the cells on either side of the transfer port were not empty.

The present practice in the art to avoid data rate reduction is to transfer to the major loop, a fixed number of bits, say two, from each minor loop at a time. In each transfer, one bit forms part of a first word while the other bit belongs to the next successive word.

ERROR IN MULTIPLE EXTRACTED CONTIGUOUS WORDS AND RESULTANT AMBIGUITY

An error arising from a loop defect would place each of the bits in the same bit position in multiple extracted contiguous words in doubt. For the bits in the same bit position as a word pair, the error might only affect the first bit, or the second bit, or both. This applies whether the error is due to either systematic or random causes. For instance, one systematic source of error is that ensuing from a loop defect. A loop defect causes the anhiliation of bubbles. Given that a bit-coded bubble stream consists of bubbles (binary 1) and the absence of bubbles (binary 0), it is apparent that the sequence 00 may have due to this defect any one of the values 11, 01, 10, or 00.

Now, each defective minor loop affects all bits coming from that minor loop. The physical layout and geometry of the bubble chip is such that each loop accepts or delivers a predetermined number of bits, say 2 bits, in a sequential chain of data onto the read or write conductor. Thus, a defective minor loop always causes errors in the same bit position in successive words in sequential flow of an r-tuple of $m$ bit words.

A MAJOR/MINOR LOOP MEMORY SYSTEM AND DEFECT INDICATION

Figure 1A:
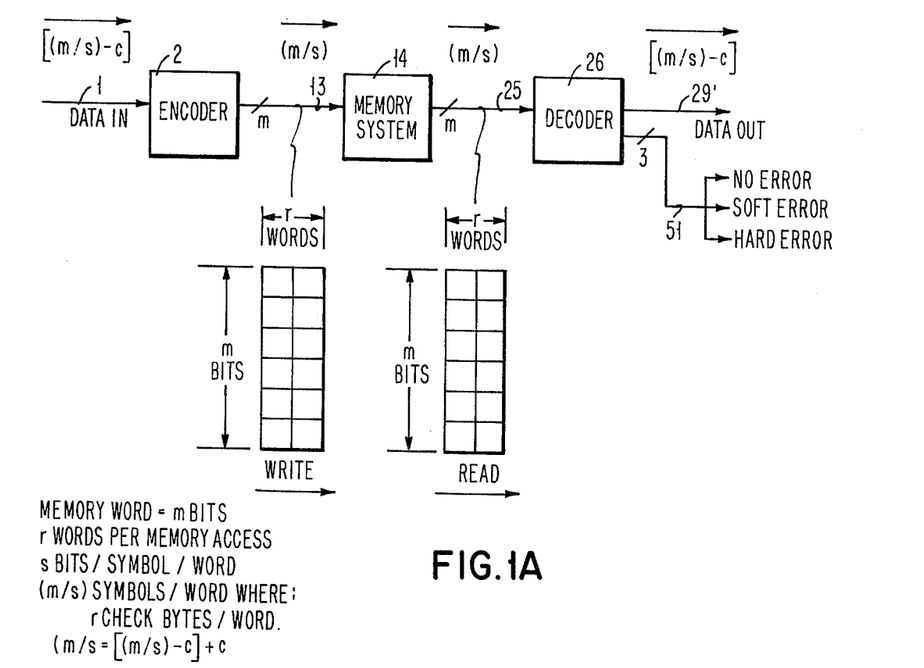
FIG. 1A shows a block diagram in which encoded data is accessed from a memory system and further in which hard/soft/no error indication is provided by the decoder.

Referring now to FIG. 1, there is shown a general block diagram of a storage system incorporating the invention. Typically, data in some predetermined format is applied to input path 1 to an encoder 2. The encoder reformats the data, calculates and adds to the data a predetermined number of error checking bits, and writes the data into designated locations in memory system 14 over path 13. The data applied to memory system 14 is serially by word and parallel by bit. Decoder 26 extracts data from memory system 14 also serially by word and parallel by bit over path 25. The decoder 26 tests the extracted data as to its error condition by, in effect, recalculating the error checking bits and comparing them as against the received error checking bits. A logic arrangement and other means contained within decoder 26 provide discrimination as among the occurrence of no error in extracted data, soft error, or hard error on respective conductors on path 51.

DATA FORMATS AND THE USE OF THE PATEL CODE TO MINIMIZE REDUNDANCY DEVOTED TO ASCERTAINING ERROR IN EXTRACTED r WORD TUPLES

As previously pointed out, each memory word is $m$ bits in length. Also, $r$ words at a time are involved in each memory access. Thus, as a point of convenience, the bits of each symbol may be spread among the $r$ words. Accordingly, for $s$ bits per symbol per word, there exist $m/s$ symbols per word where $c$ of the symbols per word are the number of check symbols per word. The number of symbols per word less the number of check symbols is represented by $[(m/s)-c]$ as applied to the encoder. The encoder 2 adds $c$ check symbols (bytes) per word such that $(m/s) = [(m/s)-c]+c$ at its output as written into memory system 14. Likewise, there are $m/s$ symbols per word extracted from the memory. Decoder 26 restores the original data $[(m/s)-c]$. It will be further observed that the data format written into and extracted from the memory is $m$ bits wide and $r$ words in depth.

Each of the words of an extracted $r$ tuple of words consists of $c$ check bits and $m-c$ data bits. That is, there is included within each $m$ bit word extracted from memory $\log_2(m)$ bits to detect an error. For each $r$-tuple of $m$ bit words extracted, then $r(\log_2(m))$ bits would be devoted to error detection/correction. It is clear that since the occurrence of an error affects counterpart bit positions in each word of an r-tuple of consecutively extracted words, then the range of error detection/correction for $\log_2(m)$ bits is normally limited to $m$ bits. This could be extended to $rm$ bits. This is accomplished by calculating the value for each one of the $\log_2(m)$ bits as a function of the data bits in counterpart bytes in each word of mutually exclusive r-tuples of multi-byte code words. The error detection efficiency is further enhanced by grouping $s$ bits per word in each of the r-tuple consecutively extracted words. Such an error checking encoding scheme is found in the Patel code as described in U.S. Pat. No. Re. 28,923, reissued Aug. 3, 1976.

LOGICAL IMPLEMENTATION OF THE SYSTEM AND THE INVENTION

Figure 1B:
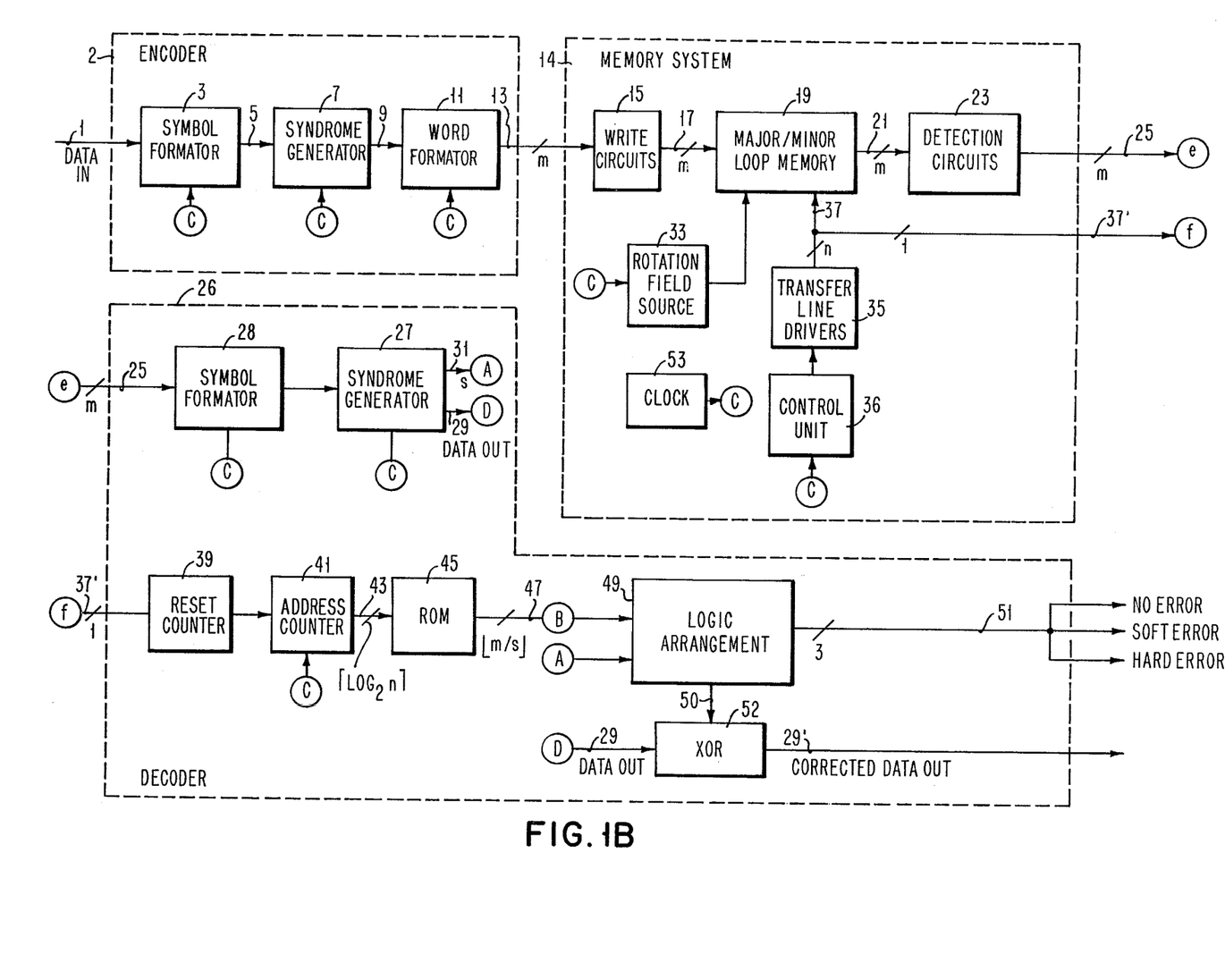
FIG. 1B is a detailed logical embodiment of the encoder, memory system, and decoder of FIG. 1A.

Referring now to FIG. 1B, there is shown a logical implementation of the system of FIG. 1A. The system is synchronized from a common clock reference 53 whose clock output C synchs the essential elements of encoder 2, memory 14 and decoder 26. Functionally, encoder 2 is primarily directed to data formatting which is provided by symbol formator 3 and word formator 11. The error checking bits are appended to the symbols by syndrome generator 7. More particularly, symbol formator 3 in response to data in path 1 formats 32 data input bits into eight four-bit symbols. These are applied to syndrome generator 7 over path 5. Syndrome generator 7, in turn, generates two four-bit check symbols as a function of the data symbols according to the Patel patent. Finally, word formator 11 responsive to the output of generator 7 over path 9 formats the 32 data bits and the eight check bits into a 20 parallel by 2 serial format.

Memory system 14 comprises an $m \times n$ array word organized loop memory 19, write circuit 15 for converting binary coded electrical streams into binary coded bubble streams for entry into memory 19 over path 17, detection circuits 23 for converting binary coded bubble streams over path 21 from memory 19 into binary coded electrical signals on path 25, and necessary field maintenance and accessing circuitry 33, 35, 36, as driven off of clock 53. The maintenance and accessing circuitry includes rotating field source 33 for generating the rotating magnetic field necessary to propagate information on the bubble chips. Also included is control unit 36 synchronized to clock 53 for regulating the transfer line drivers 35 to read and write by both actuating the appropriate transfer switches and causing bubbles to be moved to or from the minor loops.

Decoder 26 converts the $m \times r$ bit format into another format and tests the syndrome of the received data. Synchronized with the extraction of data is the address of the row of minor loops from which a given r-tuple of m-bit words is being extracted. This information together with the presence or absence of a non-zero syndrome is applied to a logic arrangement 49. In this system, the logic arrangement serves two functions. The first function is to provide a signal discriminating as to the presence of no error, soft error, or hard error. The second function is to correct the data before it is sent out of the decoder.

The decoder comprises a symbol formator 28 specifically responsive to the 20-bit parallel by 2-bit serial format from detection circuits 23 over the $m$ parallel conductors of path 25. Formator 28 converts the data into ten four-bit symbols. In turn, syndrome generator 27 generates an eight-bit syndrome based upon the output of formator 28 according to the Patel patent. Two distinct outputs are provided from generator 27. The first is the syndrome on path 31 and the second is the data on path 29. It will be observed that path 29 is applied as one of two inputs to an exclusive OR gate 52. The other input 50 consists of correction data from logic arrangement 49. The correction information is exclusively OR'ed against the data on path 29 producing a corrected data output on path 29'.

As was previously suggested, an r-tuple of words are extracted from memory 19 on each access. In practice, this means a pre-determined $r$ number of bits from each minor loop in a pre-selected row are transferred. It is part of this invention to identify the defect status condition of the minor loops in the row currently being accessed. A vector or pointer of defect status information as a function of the rows of the array is contained in read only memory (ROM) 45. The necessary synchronization of ROM 45's addressing means (address counter 41) is provided by a reset and hold tapped from the transfer line driver path 37 over path 37' through reset counter 39. Reset counter 39 holds the address counter 41 in the reset state until a pre-determined delay after the start of a memory read operation. The delay is of a magnitude sufficient to synchronize the syndrome output of syndrome generator 27 and the defect status output of ROM 45. In this regard, reference should be made to FIG. 5 which graphically depicts the relative timing between data accessing and pointer addressing. Address counter 41, when not held reset by counter 39 counts on every other rotating field cycle. This provides a binary coding output indicative of the minor loop in which the information whose syndrome is present at the output of syndrome generator 27.

Figure 4A:
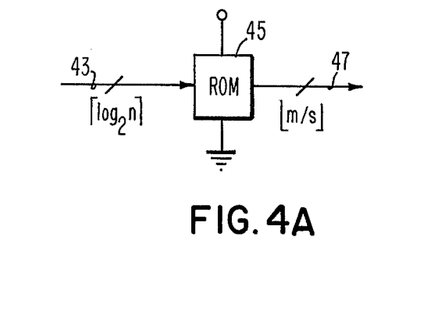
FIG. 4A depicts a read-only memory (ROM) having a minimum number of input/output conductors.
Figure 4B:
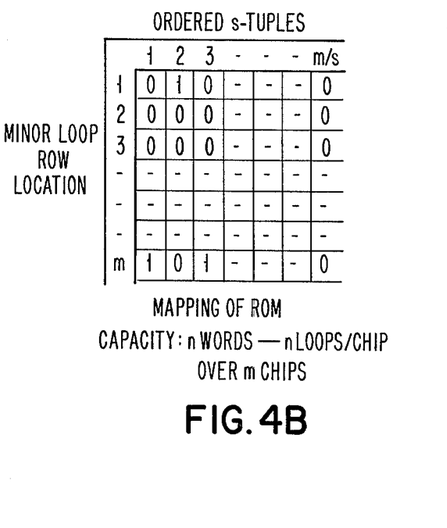
FIG. 4B shows a mapping of the defect status of each of the memory word locations.

Read only memory 45 generates status information which is coded into the memory based on results of testing of the bubble chips. These testing results may be done at the factory and specify which of the chips have defective minor loops at loop locations specified by the read only memory address provided by address counter 41. A minimum input/output conductor configuration and illustrative mapping for the ROM are shown in FIGS. 4A and 4B.

The last major element of decoder 26 is logic arrangement 49. The logic arrangement is responsive to syndrome $s$ on path 31 and the defect pointer on path 47. As previously mentioned, the logic arrangement functionally provides the error discrimination which is the invention contribution as well as data correction. The error discrimination is provided on path 51 while the data correction information is provided on path 50 to exclusive OR gate 52.

THE ROM, LOGIC ARRANGEMENT, AND ERROR SOURCE INDICATION

Figures 3A, 3B:
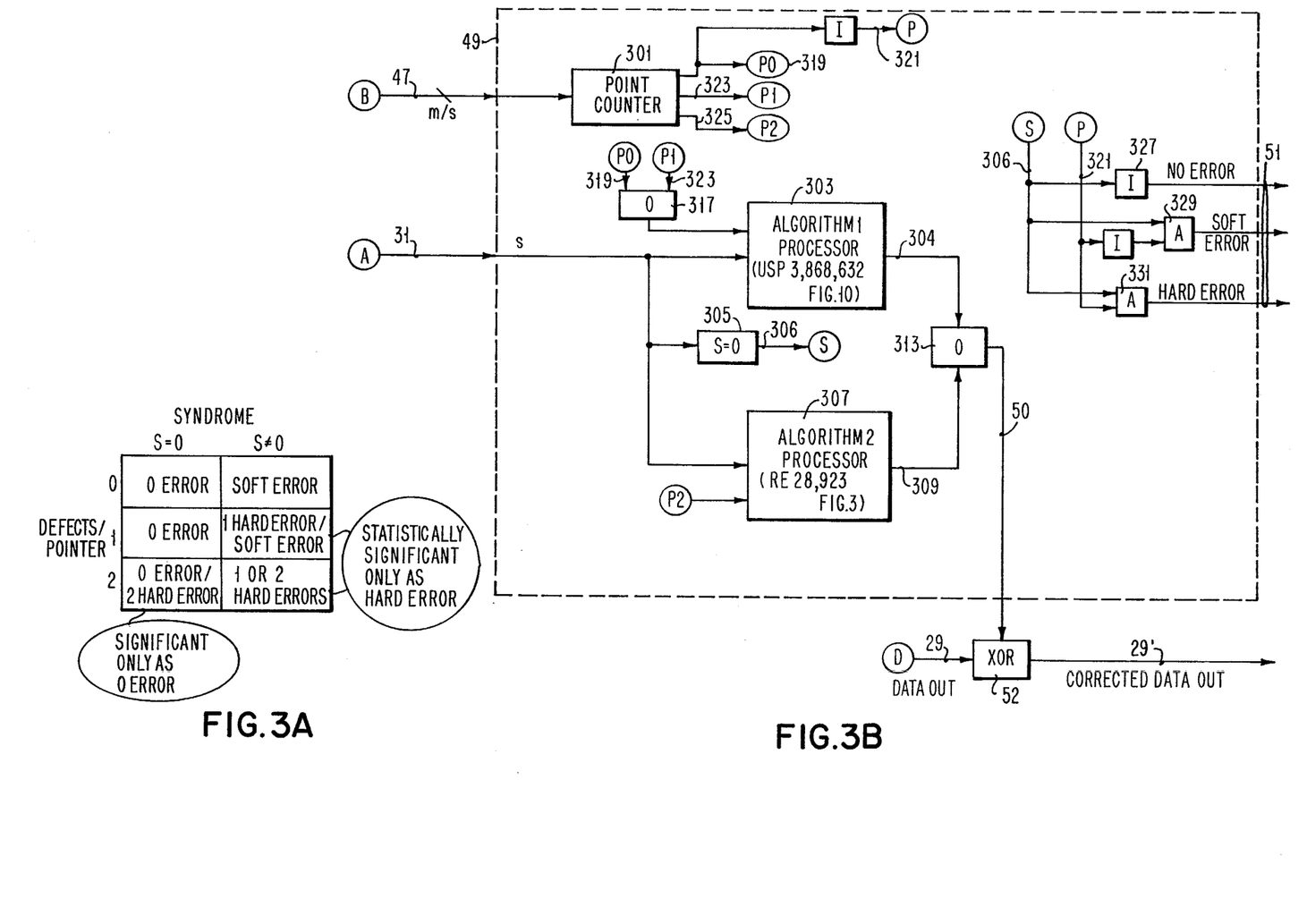
FIG. 3A shows a concordance between the syndrome and number of errors per word.
FIG. 3B exhibits a logic arrangement, i.e., output hard/soft/no error detector according to the invention.

Referring now to FIG. 3A, there is depicted the graphical relationship between the zero and non-zero state of a syndrome, the number of defects per pointer extracted from ROM 45 and the zero, soft error, and hard error condition. For the exemplary system using the Patel code, there exists the logical possibility of zero, and multiple hard and soft erros. However, it has been found that statistical significance as to the existence of hard error derives only from the syndrome being non zero and there existing one or more defects per pointer. As a result, a "syndrome equal to zero" is uniformly construed as the occurrence of no error. With the "syndrome no equal to zero and no defects per pointer," this is resolved as soft error. With one or more defects per pointer and a non-zero syndrome, this is construed as a hard error. The logical embodiment of this table can be found in FIG. 3B.

The logic arrangement 49 is responsive to the defects per pointer information from ROM 45 over path 47 and the occurrence of a zero or non-zero syndrome from generator 27 over path 31. The output from the ROM is terminated in point counter 301. The output of the point counter is a direct index of the number of loop defects in a given row of loops. The outputs respectively on paths 319, 323, and 325 represent 0, 1, and 2 defects. The inverse of 319 is provided on path 321 concurrently.

Now syndrome S obtained from generator output 31 can be applied to meter 305 for indication as to whether it is zero or non-zero. It is satisfactorily embodied in the logic represented by elements 306, and 321, to 331.

If the existence of zero defects is represented by a one, then its inverse is zero. Likewise, if one or more defects is represented by zero on line 319, then its inverse is one on line 321. It follows that for a non-zero syndrome represented by a one on path 306 concurrently with a one on path 321, then AND gate 331 and hence the hard error line output will be energized. Similarly, for a non-zero syndrome on line on path 306 and a zero on path 321, then the soft error output will be energized through end gate 329. Likewise, the existence of a zero syndrome, i.e., a zero on path 306 energizes the no-error output through inverter 327.

THE LOGIC ARRANGEMENT AND ERROR CORRECTION

The remaining function performed by logic arrangement 49 deals with error correction. The Patel code has the capacity of correcting a single or double error. If the point counter 301 shows zero or one defects, i.e., lines 319 and 323 provides an input to syndrome processor 303 through OR-gate 319, the syndrome S on path 31 is processed for single error correction, and correction signals are generated by element 303. Likewise, the point counter output 325 is energized then element 307 would generate the necessary correction signals for the correction of two symbols in error. A single error correction signal over path 304 would be gated through exclusive OR-gate 52. Also, the correction signals suitable for correcting two errors are generated from element 307 over path 309 onto path 50 through OR-gate 313.

For purposes of completeness, a processor for correcting single errors suitable for use in element 303 may be found in FIG. 10 of Patel et al, U.S. Pat. No. 3,868,632 issued Feb. 25, 1975. This patent describes an apparatus which issues a set of correction signals. These correction signals are applied in the invention of the instant specification to path 304 and also eventually as one input to exclusive OR-gate 52.

If conductor 325 indicates a P2 signal, then the syndrome will be processed for correction of two errors by processor 307, embodied in FIG. 3 of Patel U.S. Pat. No. Re. 28,923 reissued on Aug. 3, 1976. The output of processor 307 appears on path 309. It is gated through to path 50.

THE ROM AND DEFECT STATUS

Referring now to FIGS. 4A and 4B, there is shown the input and output terminations of the ROM 45, together with an illustrative mapping of its contents. There are $n$ word addresses and $m$ chip locations in memory 19. Corresponding to each $r$ word tuple, address, there may be one, two, or more chips with defective loops. This information is gathered from prior testing and stored away in the ROM. The $n$ vectors or pointers are accessed by signals on $[\log_2(n)]$ conductors forming path 43 from address counter 41. The vector at each of the $n$ addresses has $[m/s]$ entries, corresponding to the number of $[m/s]$ symbols of each code word. Each entry also corresponds to "$s$" adjacent chips. For example, entry one corresponds to chips one and two, entry two corresponds to chips three and four. For each r-tuple (loop) row-address, the ROM stores a $[m/s]$ bit vector in which a non-zero value indicates defective chips. There may be up to two non-zero values in any vector so that the resulting errors in the corresponding r-tuple word are correctable by the error checking code bits.

It is possible that all m-chips in a module could be defective. The defects could be in the minor loop, the major loop, or even chip killer defects. Any or all such defects are masked by the code as long as only two or less defective chips are involved in a accessed r-tuple word. When three or four defective chips affect an r-tuple word, such defects are masked if the defective chips are confined to pairs of adjacent chips so that only two code symbols are involved. Furthermore, when an extracted r-word tuple is not impacted by such defects, the code will provide protection from random soft errors. This reliability enhancement feature can be invoked in an adaptive manner whenever the vector is all zeros. Note in FIG. 4B that associated with each of the $n$ minor loop row locations is a vector having up to two "ones" in its $[m/s]$ bit positions.

A DETAILED MECHANISM FOR MAJOR/MINOR LOOP BUBBLE TRANSFER

Referring to FIGS. 2 and 6A through 6D, there are depicted respectively the major/minor loop memory 19 configuration and the minor/major loop data transfer. "$m$" bits of each word are applied on respective paths 131, 132 . . . 13$m$ to counterpart write generators. The write generators convert an electrical binary one or zero signal into a bubble or no bubble equivalent. These are placed on respective write conductors 171, 172, . . . 17$m$. Transfer switches, for example, $W_{11}$, $W_{21}$, $W_{31}$ . . . $W_{n1}$ on any given chip, say 271, when selectively activated will cause that bubble to be transferred from the write conductor to the counterpart loop. It will be recalled from FIG. 1A "$r$" consecutive words are applied in bits and parallel on the respective write conductors. Each serial cluster of $r$ binary coded bubbles is written into a preselected row of minor loops upon actuation of the corresponding write transfer switches in that row. Similarly, r consecutive binary coded bubbles may be transferred from each of the minor loops in a given row upon activation of the counterpart read transfer switches to the read conductor counterparts. While memory accessing strategy per se is beyond the scope of this invention, it is clear that a conventionally designed control unit 36 operating appropriate transfer switches has the capability of accessing rows of minor loops on a random access or other (sequential) basis.

Figure 6A:
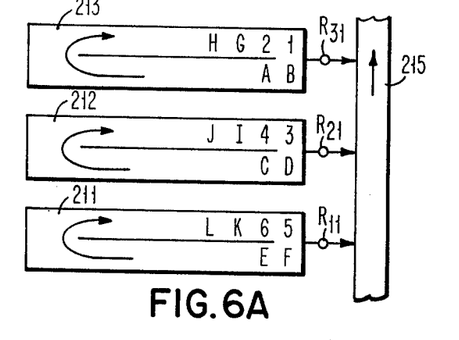
FIGS. 6A–6D show a minor loop/major loop data transfer.
Figure 6B:
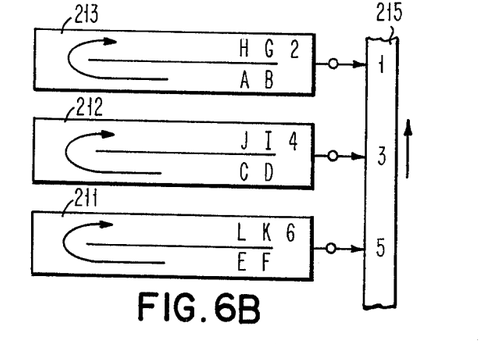
Figure 6C:
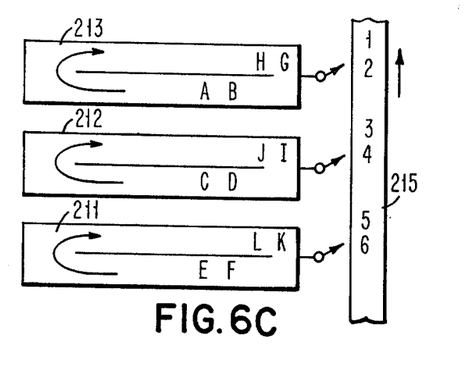
Figure 6D:
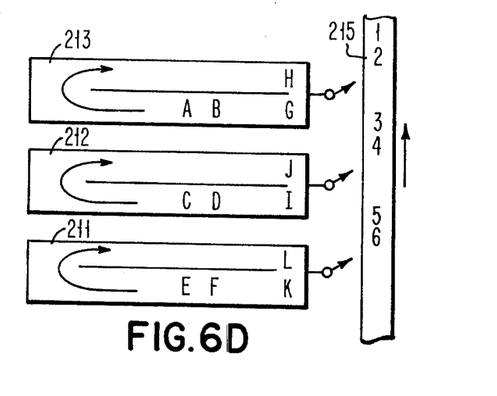

Referring again now to FIGS. 6A-D, there is shown a minor-to-major loop data transfer. In FIG. 6A three minor loops 211, 212, and 213, are each shown with recirculating coded bubble. In these figures, each alphanumeric symbol represents a corresponding coded bubble. Coupling each of the minor loops to the read conductor 215 are read transfer switches $R_{11}$, $R_{21}$, and $R_{31}$. With the read switches in a closed position at an arbitrary point in time, two consecutive coded bubbles are transferred from each loop to the read conductor. Thus, in FIG. 6b, the bubbles 1, 3, and 5 are correspondingly transferred from minor loops 213, 212, and 211. At the next clock interval, the contents of the read conductor are shifted by one cell to accept the next group of bubbles respectively 2, 4, and 6 prior to the read transfer switches being set to the open position. In this regard, the r word tuple is two leaving a corresponding two coded bubble open "hole" in the same relative positions in the data circulating in each of the corresponding minor loops. Self evidently, two coded bubbles could be transferred into the minor loop by a write conductor positioned at the other end with the appropriate timing and write transfer switch considerations.

To recap a defective minor loop affects all bits coming from that minor loop. The physical layout and geometry of the bubble chip is such that each minor loop accepts or delivers two bits in a sequential chain of data onto the read or write conductors. A defective minor loop consequently always causes errors in the same bit positions in two successive words in sequential flow of say $m=20$ bit words. This is an interdependence in the way the minor loop defects manifest into errors. Significantly this interdependence is caused by an inherent property of this widely accepted form of bubble memory organization.

ONE FORM OF THE PATEL CODE ADAPTED TO THE INVENTION

In the prior discussion of encoder 2 in FIGS. 1A and 1B, it was observed that the data was formatted as an r tuple of words. For a given s bits per symbol per word, it meant that the actual coding of a symbol would be distributed over each of the words in the r tuple. The size of r is related to the geometry of the minor loop/major loop transfer. In the preferred embodiment the r word tuple are set equal to mutually exclusive pairs of words therein each $m=20$ bit word consists of 16 binary data bits and 4 binary check bits. A known defective minor loop in a given major/minor loop memory organization will create an erasure in the corresponding bit positions in both of the words of the pair. With this foundation, the following data format for purposes of error correction coating can be elucidated.

Let $Z_i$ denote the data symbol in which $Z_i(o)$, $Z_i(1)$, $Z_i(2)$, and $Z_i(3)$ denote the 4 binary components. Similarly $C_i$ represents the check symbol in which $C_i(o)$, $C_i(1)$, $C_i(2)$, $C_i(3)$ denote the 4 binary components. Let W be a code word consisting of the 8 data symbols and two check symbols corresponding to an r word tuple of 40 bits of two memory words $V_1$ and $V_2$. This can be represented as $W = (Z_1, Z_2, Z_3, \ldots, Z_8, C_1, C_2)$.

The first two components of each symbol in W are assigned from the first word $V_1$. The remaining two components of each symbol in W are assigned from the second word $V_2$. Thus, $V_1 = [Z_1(o), Z_1(1), Z_2(o), Z_2(1), \ldots, C_1(o), C_1(1), C_2(o), C_2(1)]$ $V_2 = [Z_1(2), Z_1(3), Z_2(2), Z_2(3), \ldots, C_1(2), C_1(3), C_2(2), C_2(3) 2]$ The relationship of W to $V_1$ and $V_2$ is as follows:

| $V_1$ | (0) (1) | (0) (1) | | (0) (1) | (0) (1) | (0) (1) |
|---|---|---|---|---|---|---|
| $V_2$ | (2) (3) | (2) (3) | ... | (2) (3) | (2) (3) | (2) (3) |
| W | $Z_1$ | $Z_2$ | | $Z_8$ | $C_1$ | $C_2$ |
| | data symbols | | | | check symbols | |

32 data bits arranged in 8 symbols of 4 bits/symbol
8 check bits arranged in 2 symbols of 4 bits/symbol For a higher error correction capability, use can be made of an error checking encoding that deals with symbols from a higher order field. In particular, the higher order field of interest is a Galois Field GF $(2)^4$ of 16 elements. The symbols in this field can each be represented by a 4-digit binary vector. The data and check symbols, as well as errors, are groups of specified 4 binary bit positions. One symbol error in this arrangement corresponds to any combination of errors in the corresponding 4 binary digits. For simplicity, the code can be presented in a simplified matrix notation instead of a field notation. The check symbols are computed from the data symbols using the following matrix relations:

$C_1 = Z_1 + Z_2 + \ldots + Z_8$
$C_2 = T Z_1 + T^2 Z_2 + T^3 Z_3 + \ldots + T^8 Z_8$
$+ = $ modulo 2 sum
$T = $ companion matrix of polynomial y(x) of degree 4 with binary coefficients
$T^i = i^{th}$ power of matrix T
Let $g(x) = g_o + g_1 x + g_2 x^2 + g_3 x^3 + x^4$  $g(x) = 1 + x^3 + x^4$ $$\therefore T = \begin{matrix} 0 & 0 & 0 & g_o \\ 1 & 0 & 0 & g_1 \\ 0 & 1 & 0 & g_2 \\ 0 & 0 & 1 & g_3 \end{matrix} = \begin{matrix} 0 & 0 & 0 & 1 \\ 1 & 0 & 0 & 0 \\ 0 & 1 & 0 & 0 \\ 0 & 0 & 1 & 1 \end{matrix}$$

The companion matrix T is given explicitly in terms of the coefficient $g_i$ of the polynomial $g(x)$. Since $g(x)$ is a binary primitive polynomial of degree 4, then:

$T, T^2, T^3, T^4, \ldots, T^{14}, T^{15}$ are distinct matrixes and:

$T^{15} = T^o = I = $ identify matrix

Thus:

$T^i = T^{-i} = T^{15-i}$.

Another important property of matrix T is that the sum of $T^i + T^j$ for any i and j is also a power of T.

Multiplication of matrix T raised to the ith power with any 4 digit binary vector can be accomplished by means of a feedback shift register in which the feedback connections are according to the coefficient of $g(x)$. These properties of matrix T simplify the encoder and decoder implementations of the code for calculating $C_1$ and $C_2$. The encoding and decoding process is described in the aforementioned Patel reissue patent.

The Patel code is capable of correcting any two symbols in error when the erroneous symbol positions are indicated by means of external vectors or pointers. It can correct any one erroneous symbol without such pointers. This capability is applied in the present code format and bubble memory organization for fault tolerance against defective minor loops and reliability enhancement against soft errors in the absence of such defects.

As another aspect of the Patel Code is applied to the invention, is that of the $m$ chips in the bubble memory, two of them are dedicated to the storing of redundancy bit patterns. In this regard, $m$ is related to $s$ and $sr$ by constraining it to lie in the range $3s \leq m \leq s(1+2^{sr})$.

RELATIVE TIMING BETWEEN DATA ACCESSING AND OTHER SYSTEM TRANSFERS

Figure 5:
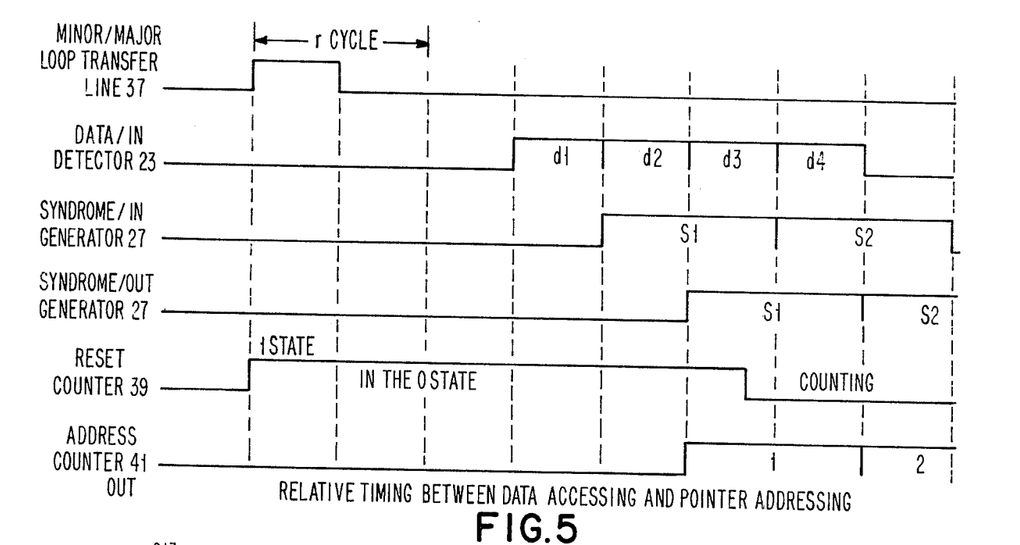
FIG. 5 exhibits the relative timing between data accessing between the memory and defect or pointer addressing from the ROM.

Referring now to FIG. 5 when taken together with FIG. 1B, there is shown the relative timing between data accessing and other transfers in the system. The relative timing of FIG. 5 uses the minor/major loop transfer path 37 as a reference. The pulse imposed upon the line 37 is derived from transfer line drivers 35. The $r$ cycles referred to is the amount of time necessary to move $r$ coded bubbles from the minor loop to a major loop (read conductor). The displacement of the data being applied to the read detectors of detection circuits 23 is due to the necessary propagation time delay. It will also be observed that there is an overlap between the conversion of data from a magnetic bubble to an electric signal format in detector 23 and the actuation and output from syndrome generator 27. Significantly, reset counter 39 inhibits address counter 41 for a time period from the start of a transfer through and including an initial output from syndrome generator 27. The importance here is securing synchronization of the output of ROM 45 with the accessing of the memory 19.

It will be understood that the decoder portion of the bubble memory system of this invention can in addition to hard/soft error discrimination, provide an error detection and correction capability. While particular embodiments of this invention have been shown, it will be understood that the invention is not limited thereto, since many modifications may be made and will become apparent to those skilled in the art.

What is claimed is:

1. A method for discriminating between no error, defect induced error, and noise induced error in formatted data normally stored in and extracted from an addressable memory, said data being inclusive of redundancy patterns, the method comprising the steps of:
    forming a table of concordance between each memory address and its defect status;
    accessing both formatted data from at least one preselected memory address and the counterpart defect status from the concordance table;
    determining the syndrome of the accessed data; and
    indicating from the accessed data the presence of either:
        a defect induced error upon the concurrence of a non-zero syndrome and a defect at the counterpart memory address;
        a noise induced error upon the concurrence of a non-zero syndrome and no defect; or
        no error upon the occurrence of a zero syndrome.

2. A method for discriminating between no defect, defect induced error, and noise induced error in data formatted as $r$ word tuples of $m$ bits per word and $s$ bits per symbol per word, each $r$ word tuple being normally stored and extracted in a corresponding row of $m$ loops of a $m \times n$ array of loops organized as a major/minor loop addressable memory, $m$ bits per word being distributed one to one among the $m$ loops in a row, each word having $(m/s)-c$ data symbols and $c$ checking symbols, the method comprising the steps of:
    forming a table of concordance between the address of each of $n$ rows of loops and its defect status;
    accessing an $r$ word tuple from a row of loops and the counterpart defect status from the concordance table;
    determining the syndrome of the accessed $r$ word tuple; and
    indicating in the accessed $r$ word tuple, the presence of either:
        a defect induced error upon the concurrence of a non-zero syndrome and a defect at the counterpart row address;
        a noise induced error upon the concurrence of a non-zero syndrome and no defect; or
        no error upon the occurrence of a zero syndrome.

3. A method according to claim 2 wherein the defect status information contained in the table comprises $n$ vectors of $m/s$ positions per vector, a binary indication of a first or second kind in any vector position being respectively indicative of a defect or no defect in a corresponding mutually exclusive pair of adjacent loops in the row.

4. A method according to claim 2 wherein the memory system of the major/minor loop type comprises a row of $m$ chips, each chip in turn including $n$ parallel loops arranged in a column; the memory system further comprises means for writing bit coded streams into each loop, a mutually exclusive $m$ bit word being formed by each ith bit of each jth loop of each of the $m$ chips; means for recirculating the bit coded streams within the loops; and means for extracting $m$ bit words therefrom.

5. A method according to claim 4 wherein the memory system extraction means further comprise:
    $m$ conductors, each conductor coupling the $n$ loops of a corresponding chip; and means for transferring $r$ contiguous bits at a time from each of the $n$ loops to the associated conductor, groupings $s$ of the conductors forming $m/s$ symbol positions in a $m$ bit word.

6. A method according to claim 2 wherein each symbol consists of $sr$ bits in any $r$ word tuple.

7. A method according to claim 4, wherein in the memory system two of the $m$ chips are dedicated for storing redundancy bit patterns, wherein $m$ lies in the range $3s \leq m \leq s(1+2^{sr})$.

8. A method according to claim 2 wherein the $r$ word tuple consists of mutually exclusive pairs of contiguously accessible words.

9. A method according to claim 4 wherein the memory system further comprises a programmable read only memory having $n$ addressable locations for storing $m/s$ bit vector per location, each bit having a first binary value being indicative of a defective chip.

* * * * *